Figure 4:
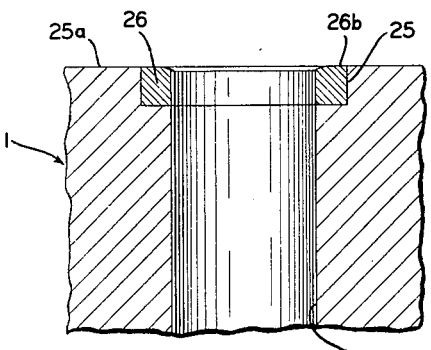

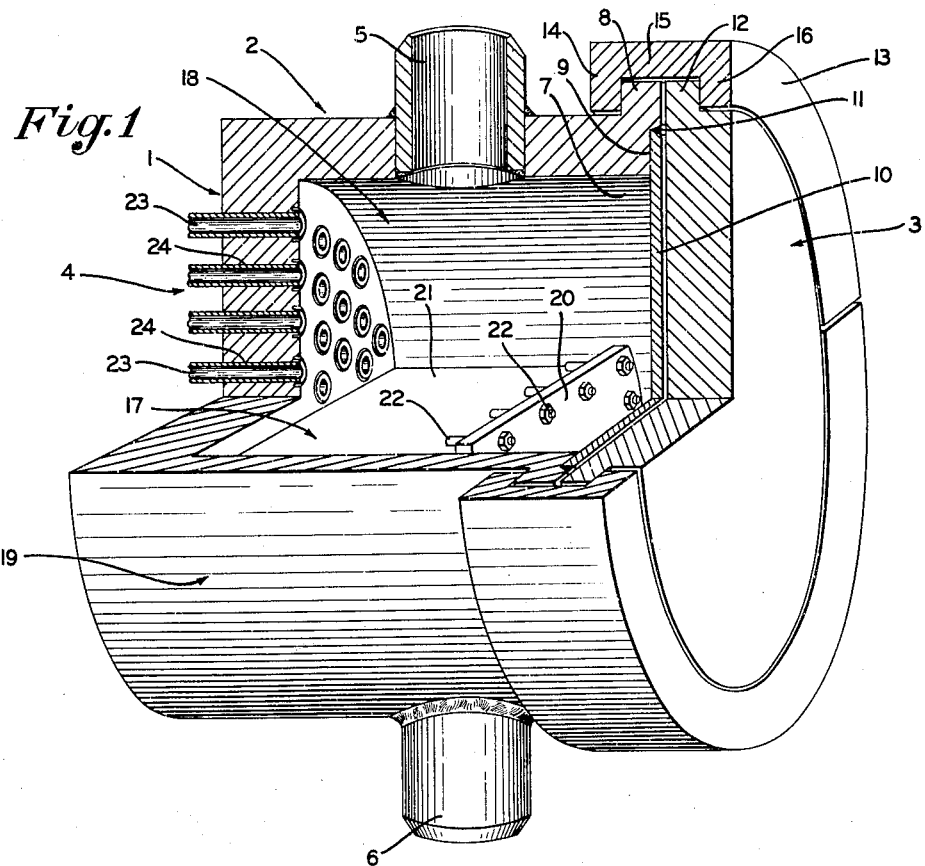
Fig. 1
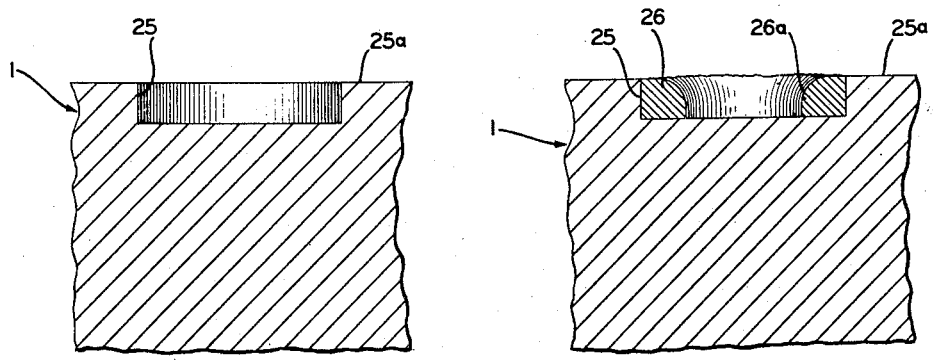
Fig. 2
Fig. 3
INVENTOR.
Anthony J. Ryder
BY Frease & Bishop
ATTORNEYS Nov. 24, 1959 A. J. RYDER 2,914,346
METHOD OF WELDING STAINLESS STEEL AND WELDED JOINTS
Filed May 21, 1954 3 Sheets-Sheet 2

INVENTOR.
Anthony J. Ryder
BY Frease & Bishop
ATTORNEYS

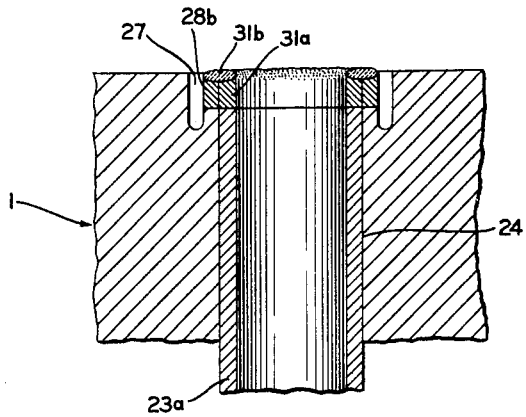
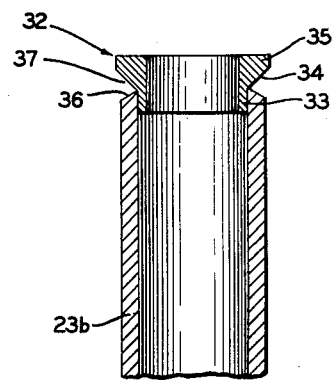
Fig. 10      Fig. 11
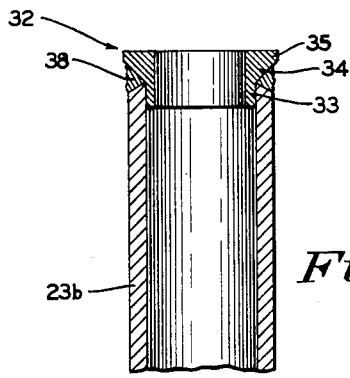
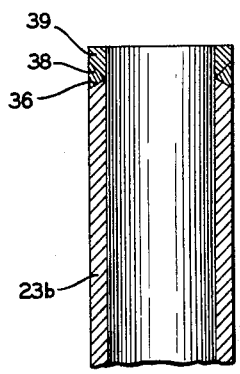
Fig. 12      Fig. 13
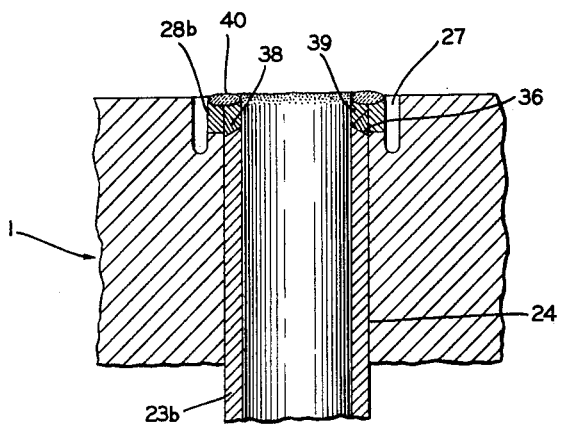
Fig. 14

United States Patent Office 2,914,346
Patented Nov. 24, 1959

2,914,346

METHOD OF WELDING STAINLESS STEEL AND WELDED JOINTS

Anthony J. Ryder, Massillon, Ohio, assignor to The Griscom-Russell Company, Massillon, Ohio, a corporation of Delaware Application May 21, 1954, Serial No. 431,394

7 Claims. (Cl. 285—189)

My invention relates to improvements in method of welding tubes to tube sheets in a heat exchanger and more specifically to a method of welding light gauge tubes to heavy forged tube sheets. Even more specifically my invention relates to a method of welding light gauge tubes to heavy forged tube sheets where the tubes and tube sheets are made from metal whose composition has heretofore caused great difficulties in producing a sound weld between the two parts such as, for instance, austenitic stainless steel.

In cases where heat exchanger tubes and tube sheets are constructed of readily weldable material, the tubes and tube sheets are sometimes connected by forming holes through the tube sheets, then expanding the tube ends within the holes in the tube sheets, and then welding the ends of the tubes to the outer side of the tube sheet by usual welding procedure. This has produced a satisfactory construction obtaining sound welds between the tubes and tube sheets.

When, however, the tubes and tube sheets are made of alloy steels that have poor weldability such as, for instance, austenitic stainless steel, there has been great difficulty encountered in obtaining a sound weld between the tubes and tube sheets and particularly in the case where it is necessary for the weld to withstand high stresses because of high pressure liquids or gases contained in the tubes. This is particularly true where the tubes and tube sheets are of the same austenitic stainless steel material.

The reason for the poor weldability of this type of material, that is austenitic stainless steel, is that in the welding of the tubes and tube sheets, the tube parts become heated to a relatively high temperature. In this type of steel there is a temperature range lower than the melting temperature of the material where the steel passes through a brittle phase when cooling from the high welding temperature. This causes segregation of carbides at the grain boundaries in the microstructure of the material and thermal stresses are present during cooling from welding temperature, which result in cracks and microfissures in the finally welded joint.

These microfissures are not serious in themselves but are highly undesirable because they become the foci of serious cracks after a period of time in operation of a heat exchanger and particularly when exposed to high stresses caused by high pressures being carried in the tubes.

When the tubes and tube sheets are made from stainless steels of comparatively high carbon content this microfissuring can be substantially reduced by a careful control of the carbon to silicon ratio in the welding rod used in the welded joint. However, with the low carbon stainless steels, for instance type 347 (columbium stabilized) stainless steel which has a maximum of .08% carbon, this control of the carbon to silicon ratio in the welding rod is impractical. It is difficult to produce a welding rod having a low enough silicon content to produce sound welds between parts of this low carbon austenitic stainless steel material.

It has been found in the welding of austenitic stainless steels, that if a certain amount of ferrite is added to the weld joint during the welding process, there is less tendency for microfissures in the finished welded joint and some success has been had in welding this type of material by introducing ferrite into the weld. This is very difficult, however, since it requires a very careful balance between the austenite and ferrite forming elements in the welding rod; and the weld joint is very susceptible to dilution by the tube and tube sheet base metal. Another great disadvantage to this method of adding ferrite to the weld is that in the microstructure of the weld, the ferrite islands, upon exposure to the elevated welding temperatures, transform into a sigma phase and render the weld deposit hard and brittle at ordinary temperatures resulting in an easily fractured weld joint.

Another great difficulty encountered in welding austenitic stainless steel tubes to tube sheets of the same material is the fact that the frequency of microfissures and cracks is greatly increased by an increase in the thickness of the sections to be welded. Tube sheets, of course, have a section of greater thickness than the thickness of the tube walls.

An additional problem that is presented in welding austenitic stainless steel tubes to forged tube sheets of the same material is that the microfissuring problem is greatly aggravated if the two parts to be welded have discrepant grain sizes in their microstructures. Castings and slightly worked forgings undergo very little refinement in grain structure, whereas plate, strip and tubing, which are heavily worked, have resulting fine grain structures. Thus it is necessary, in the construction of a heat exchanger, to weld tubing having a fine grain structure to a forged tube sheet having a relatively large grain structure, resulting in an increased tendency towards microfissuring and cracks particularly where stainless steel is used such as type 347.

It is, therefore, a general object of the present invention to provide a method and construction of welding tubes to tube sheets which eliminates the above enumerated difficulties in the prior methods and constructions.

It is a primary object of the present invention to provide a method and construction for welding austenitic stainless steel tubes to tube sheets of the same material in which microfissuring in the finished weld is eliminated.

It is another object of the present invention to provide a method and construction for welding tubes to tube sheets in which the variation in grain size between the two parts to be welded does not cause microfissuring.

It is still another object of the present invention to provide a method of welding tubes to tube sheets in which the sections to be welded are of minimum thickness.

Finally it is an object of the present invention to provide a method and construction for welding austentitic stainless steel, such as type 347, tubes to tube sheets of the same material which does not require prohibitive controls in the welding process.

These and other objects are accomplished by the methods, steps, processes, parts, constructions, arrangements, combinations and subcombinations, comprising the present invention, the nature of which is set forth in the following general statement, preferred embodiments of which—illustrative of the best mode of which applicant has contemplated applying the principles—are set forth in the following description and illustrative in the accompanying drawings and which are particularly and distinctly pointed out and set forth in the appended claims forming a part hereof.

In general terms the improved construction of a welded joint, as between tubes and a tube sheet in a heat exchanger, may be stated as including a tube sheet having an inner and an outer side, said tube sheet having tube holes formed therein extending between said inner and outer sides, said outer side being provided with grooves surrounding and spaced from each of said tube holes forming walls between said grooves and said tube holes, said walls being composed of weld material for part of their lengths from said outer side extending inwardly toward said inner side, the ends of a plurality of tubes being received in said tube holes and extending from said inner side to said outer side of the tube sheet, and said tube ends being welded to said walls at the outer side of the tube sheet.

More specifically, the improved construction of a welded joint between tubes and tube sheets may be stated as including a low carbon austenitic stainless steel tube sheet having an inner and an outer side, said tube sheet having tube holes formed therein extending between said inner and outer sides, said outer side being provided with grooves surrounding and spaced from said tube holes forming walls between said grooves and said tube holes, said walls being composed of ferrite containing alloy weld material for part of their lengths from said outer side extending inwardly towards said inner side, the ends of low carbon austenitic stainless steel tubes being received in said tube holes and extending from said inner side to said outer side of the tube sheet, and said tube ends being welded to said walls at the outer side of the tube sheet.

Figure 5:
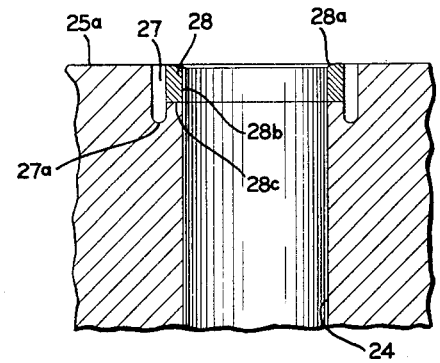
Figure 6:
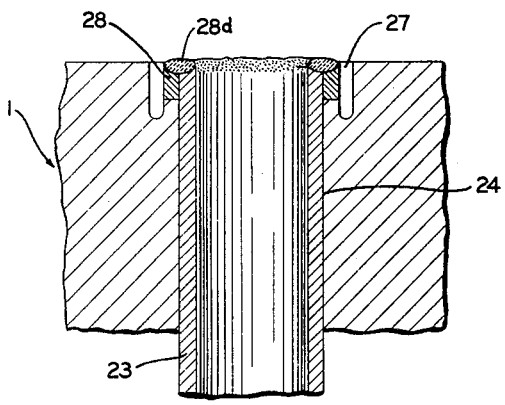
Figure 7:
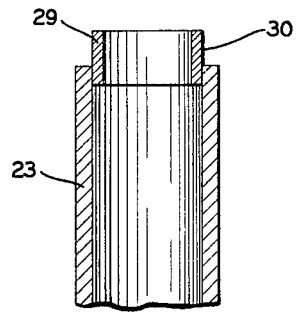
Figure 8:
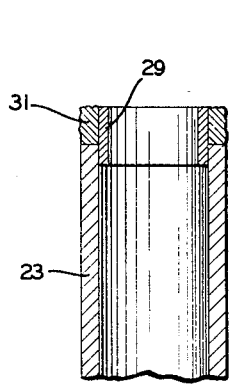
Figure 9:
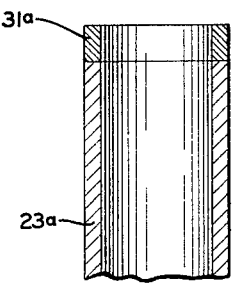

By way of example, the embodiments of the improved method and construction of welding tubes to tube sheets of the present invention is illustrated in the accompanying drawings forming a part hereof, wherein like numerals indicate similar parts throughout the several views, and in which:

Figure 1 is a perspective view, partly in elevation and partly in section of a head member for a heat exchnger incorporating the improvements of the present invention;

Fig. 2, an enlarged fragmentary sectional view of a tube sheet illustrating the first operation of the method of the present invention;

Fig. 3, a view similar to Fig. 2 illustrating the second operation of the method of the present invention;

Fig. 4, a view similar to Fig. 2 illustrating the third operation of the method of the present invention;

Fig. 5, a view similar to Fig. 2 illustrating the fourth operation of the method of the present invention;

Fig. 6, a view similar to Fig. 2 showing a tube welded into the tube sheet and illustrating the final operation of the method of the present invention;

Fig. 7, an enlarged fragmentary sectional view of a tube illustrating the first operation of a second embodiment of the method of the present invention;

Fig. 8, a view similar to Fig. 7 illustrating the second operation of the method of the present invention;

Fig. 9, a view similar to Fig. 7 illustrating the third operation of the method of the present invention;

Fig. 10, an enlarged fragmentary sectional view showing the tube welded into a tube sheet and illustrating the final operation of the method of the present invention;

Fig. 11, an enlarged fragmentary sectional view of a tube illustrating the first operation of a third embodiment of the method of the present invention;

Fig. 12, a view similar to Fig. 11 illustrating the second operation of the method of the present invention;

Fig. 13, a view similar to Fig. 11 illustrating the third operation of the method of the present invention; and Fig. 14, an enlarged fragmentary sectional view showing the tube welded into a tube sheet and illustrating the final operation of the method of the present invention.

The construction and method of the present invention is shown in the accompanying drawings and described herein for use in connecting the tubes in a shell of a heat exchanger to the tube sheet which forms a part of a head member of the heat exchanger. It should be understood, however, that the welded joint construction and method may be used in various types of equipment where it is necessary to connect thin tubes to metal walls having a thicker cross-section.

Advantages may be obtained from the use of the construction and method of the present invention for any construction in which it is necessary to connect two members, where the two members are made from materials between which it is difficult to obtain a sound weld. As hereinafter described, it is particularly beneficial in obtaining a sound weld between tubes and tube sheets made from the same austenitic stainless steel and more particularly austenitic stainless steel of low carbon content, for instance, type 347.

Fig. 1 of the drawings illustrates the head member portion of a heat exchanger and includes a tube sheet portion generally indicated at 1, a head barrel wall generally indicated at 2, a head cover plate generally indicated at 3 and a tube bundle generally indicated at 4.

The tube sheet portion 1 and the head barrel wall 2 are normally of one-piece design and of forged construction, and in this particular illustration are formed of low carbon austenitic stainless steel, such as type 347. The head barrel wall 2 is provided with a pressure inlet 5 and a pressure outlet 6 and the walls terminate in an annular open end 7 having an outwardly extending flanged end portion 8.

An annular recess 9 may be formed in the end face of the head barrel walls 2 and in this annular recess 9 a pressure sealing diaphragm 10 may be mounted. The pressure sealing diaphragm 10 is mounted in place by preferably a weld bead 11 extending completely around the periphery of the diaphragm 10 and joining the diaphragm 10 to the head barrel walls 2 to form a fluid pressure tight seal.

The head cover plate 3 may have a flat disc-like configuration covering the annular open end 7 formed by the head barrel wall 2 and is mounted closely abutting the outer surface of the pressure sealing diaphragm 10. The head cover plate 3 is of approximately the same diameter as the head barrel walls 2 and has an annular flange portion 12 extending from its outer periphery to match and closely abut the annular flange portion 8 of the head barrel wall 2. The head cover plate 3 is held in place abutting the end faces of the head barrel walls 2 by a segmental U-shaped clamping ring 13.

The clamping ring 13 has an annular recess formed in its inner periphery so that it is U-shaped in cross-section and is composed of an annular inward flange portion 14, an annular longitudinal portion 15 and an inwardly extending annular flange portion 16. The flange portion 14 engages over the tube sheet side of the annular outward extending flange 8 of the head barrel walls 2 with the longitudinal portion 15 spaced from the outer periphery of the flange portion 8 and the flange portion 12 of the head cover plate 3. The flange portion 16 engages over the outer side of the flange portion 12 of the head cover plate 3, as shown in Fig. 1.

Thus the clamping ring 13 holds the head cover plate 3 securely over the annular open end 7 formed by the head barrel walls 2. The segments of the clamping ring 13 are held in place by any desired clamping band.

The baffle member generally indicated at 17 is contained within the opening formed between tube sheet 1, the head barrel wall 2 and the head cover plate 3, and serves to divide this opening into two halves, that is, an inlet half generally indicated at 18 and an outlet half generally indicated at 19. The baffle 17 is made up of a lateral portion 20 and a longitudinal portion 21, with the longitudinal portion 21 connected to the tube sheet 1 and one side of the lateral portion 20, as shown in Fig. 1. The lateral portion 20 and the longitudinal portion 21 are connected by a series of studs 22, as shown. Thus far, the construction described forms no part of the present invention.

The tubes 23 of the tube bundle 4 are preferably seamless tubing, formed of low carbon austenitic stainless steel, and the tubes 23 extend through holes 24 formed in the tube sheet 1 and are welded in place by the method to be hereinafter described. This provides a finished construction as shown in Figs. 6, 10 or 14. A heat exchanger shell of usual construction (not shown) is connected to the tube sheet side of the head member and the tube bundle 4 is enclosed within this shell.

In operation, fluid under pressure enters through the pressure inlet 5 into the inlet half 18 of the head member and passes into the open ends of the tubes 23 connected into the tube sheet 1 in this inlet half. The fluid under pressure passes through the shell portion of the heat exchanger and returns through the tubes 23 into the outlet half 19 of the head member and leaves through the pressure outlet 6.

The tubes 23 may be connected to the tube sheet 1 by any of the methods shown in the three embodiments of the present invention. The first embodiment is shown in Figs. 2, 3, 4, 5 and 6. The second embodiment of the invention is similar to the first embodiment but includes a modified tube construction shown in Figs. 7, 8 and 9, providing a final welded construction as shown in Fig. 10. The third embodiment also is similar to the first embodiment of the invention but includes a further modified tube construction shown in Figs. 11, 12 and 13, providing the final welded construction shown in Fig. 14.

Referring to Figs. 2, 3, 4, 5 and 6, the first step of the method is to mill a shallow circular hole or recess 25 in the tube sheet 1 for each tube location, as shown in Fig. 2. Ferrite containing alloy weld metal is then deposited at 26 (Fig. 3), by metal arc welding, using a consumable electrode of ferrite containing material, around the outer periphery of the shallow hole 25 to form an annular bead 26 of ferrite containing weld material welded to the outer periphery of the shallow hole 25, extending inwardly towards the central axis of the hole 25 and substantially filling the annular corner portion of the hole 25, as shown in Fig. 3. This weld bead 26 will normally be formed so that its exposed surface is rounded at 26a from the top outside corner of the hole 25 to the bottom surface of the hole 25, as shown.

Next, the tube hole 24 is drilled through the tube sheet (Fig. 4) centrally of the shallow hole 25, but of a smaller diameter than the hole 25. In drilling tube hole 24 the inner annular edge of the weld deposit 26 is removed so that the tube hole 24 has walls of low carbon austenitic stainless steel through the major portion of the thickness of the tube sheet 1 to the bottom of the shallow hole 25 and then walls of ferrite containing alloy weld material for the depth of the shallow hole 25 to the outer side face 25a of the tube sheet 1. The outer side or face of the tube sheet 1 and of the weld deposit 26 is then surface ground or otherwise finished to provide a flat surface 26b surrounding the tube hole 24.

The next step, using the hole 24 as a guide, is to trepan or bore an annular groove 27 in the tube sheet 1 around the tube hole 24 radially spaced from the tube hole 24 a distance equal to approximately the thickness of the walls of the tube 23 to be welded in the tube hole, as shown in Fig. 5. The outer diameter of the annular groove 27 is approximately the same diameter as the diameter of the hole 25, so that most of the material that is removed in the trepanning or groove boring operation is ferrite containing weld material. The annular groove 27 preferably extends below the bottom surface of hole 25 as indicated at 27a.

Thus a thin annular or cylindrical wall 28 of approximately the same thickness as the tube 23 is formed extending from the head side face 25a of the tube sheet 1 inwardly to the bottom 27a of the annular groove 27.

The wall 28 thus comprises ferrite containing weld material 28b welded at 28c adjacent the bottom 27a of groove 27 to the tube sheet austenitic stainless steel material. Furthermore this wall 28 is composed of this ferrite-containing weld material throughout its radial wall thickness or thickness perpendicular to the axial length of the tube sheet hole 24. The inner periphery or thin annular wall 28 forms the end of the tube hole 24 and since the original weld bead 26 was rounded at 26a, a tapered edge 28a results around the head end of hole 24 and wall 28.

The next step is to assemble or telescope the cylindrical tube 23 in place in the tube hole 24 so that the end of the tube 23 is substantially even with the outer end of annular wall 28 and with the face 25a of the tube sheet 1. The tube end is then expanded in hole 24 in the usual manner.

The cylindrical ends of the tube 23 and of the thin, stubby, barrel-like annular wall of ferrite containing weld metal 28 are then welded together using Heliarc welding to fuse the outer ends of the tube 23 and of barrel wall portion 28b together, as shown at 28d in Fig. 6. The tapered edge 28a on the wall 28 aids in obtaining a smooth even weld.

Thus, a sound welded joint 28d is formed between the tube sheet 1 and the tube 23, both of which are composed of low carbon austenitic stainless steel. Since the weld 28a is formed between the tube end and the wall portion 28b containing ferrite, the welded joint 28d is free from cracks and microfissures which, if present, would become foci for the formation of cracks after a period of time in the high pressure operation of the heat exchanger.

The annular groove 27 is formed, in accordance with the invention, spaced from the tube hole 24, so that the thin annular wall 28 directly surrounding the end of the tube 23 and to which the tube 23 is to be fused, will have approximately the same thickness or at least as great a thickness as the thickness of the tube 23. Since the possibility of the formation of microfissures and cracks in a welded joint is increased by an increase in the thickness of the sections to be welded, in the improved construction, with the annular wall 28 of substantially the same thickness as that of the tubes 23, this tendency of microfissuring is eliminated.

As indicated, the microfissuring problem is greatly aggravated if the two parts to be welded have discrepant grain sizes in their microstructures. In the present case, where thin tubes are to be joined to a heavy walled forged tube sheet, the discrepancy in grain size is present.

This difficulty is present because in the forging of the head member including the tube sheet, the metal undergoes very little refinement in its grain structure; while the tube metal is heavily worked in the manufacture of the tube and has a fine grain size. By joining a tube 23 to the thin annular wall portion 28b of ferrite containing weld material, a difference of grain size is not present and consequently no microfissures occur from this difficulty heretofore involved.

The amount of ferrite in the weld material 26 deposited to form the thin annular wall 28 is critical. If there is an excess of ferrite in the welding rod used to deposit the weld metal 26, the wall 28 and the welded joint 28d between the wall 28 and tube 23 may become very brittle at ordinary temperatures and is extremely susceptible to failure particularly under high pressure operation of a heat exchanger. It has been found that the best concentration is about 8% ferrite in the welding rod alloy. With such a ferrite concentration, a sound weld can be made between a tube 23 formed of type 347 stainless steel, and the thin annular wall 28; and between the deposited weld metal 26 and a tube sheet 1 formed of type 347 stainless steel.

The second embodiment of the present invention includes the same operations in preparing the tube sheet, tube holes, barrel wall 28, etc., that are shown in Figs. 2, 3, 4 and 5. However, in the second embodiment the ends of the tubes 23 are "buttered" with ferrite containing material.

In this alternate arrangement a thin walled hollow cylinder 29 is formed from the same ferrite containing weld material used to form the thin annular wall 28 in the tube sheet, or the cylinder may be machined from tubing or bars of the proper ferrite content.

This hollow cylinder 29 having an outside diameter substantially the same as the inside diameter of the tube 23, is inserted in the end of tube 23 so as to project therefrom as shown in Fig. 7. In this manner an annular offset or shoulder 30 is formed at the end of tube 23 defined by the end of the tube 23 and the outer periphery of the projecting portion of hollow cylinder 29.

The annular offset 30 is then filled, by deposit welding, with the same ferrite containing alloy weld material used to form the cylinder 29 or the thin annular wall 28. Thus, offset 30 is filled at 31 (Fig. 8) with ferrite containing weld material. In this manner the walls of tube 23 are extended to the end of cylinder 29 with ferrite containing weld material.

The periphery of tube portion 31 is then ground or otherwise prepared to have substantially the same outer diameter as that of tube 23; and the tube end is drilled to remove the excess metal 29 and to restore its uniform inside diameter and to provide a tube 23a having an end "buttered" at 31a with ferrite containing material, as shown in Fig. 9.

The tube 23a is then inserted into prepared hole 24 and expanded therein, so that the tube end portion 31a of ferrite containing weld material is flush with the outer surface 25a of the tube sheet 1. The tube end portion 31a is then welded to the thin annular wall 28 by Heliarc welding as shown in Fig. 10, in the manner previously described, to form a welded joint 31b.

Thus, a soundly welded joint is provided between a tube and tube sheet having ferrite containing weld material 31a welded to a low carbon austenitic stainless steel tube 23a, and having the ferrite containing weld material 31a also welded at 31b to ferrite containing weld material 28b which is in turn welded to a low carbon austenitic stainless steel tube sheet 1, as shown in Fig. 10.

The third embodiment of the invention also uses the same tube sheet construction used in Figs. 2, 3, 4 and 5; but uses a slightly different procedure for forming the "buttered" tube end.

In this alternate arrangement (Fig. 11) a ring 32 having a uniform inner diameter is formed from ferrite containing weld material or may be machined from tubing or bars of the proper ferrite content. The ring 32 has a thin walled cylindrical portion 33, an outwardly extending angled or flared portion 34 and a thick cylindrical portion 35. The outside diameter of cylindrical portion 33 is substantially the same as the inside diameter of the tubes 23b, the outside diameter of the thick cylindrical portion 35 is slightly greater than the outside diameter of the tube 23b, and the angled or flared portion 34 joins portions 33 and 35.

The end of the tube 23b is upwardly inwardly tapered at 36. Hollow cylinder 32 is inserted in the end of the tube 23b, as shown in Fig. 11, to provide an annular recess 37 between the end of tube 23b and the angled portion 34 of cylinder 32. Ferrite containing weld material is then deposited at 38 in annular recess 37 so that it triangularly fills the recess and extends slightly beyond the outside diameter of the tube 23b as shown in Fig. 12.

Next, the outer peripheries of triangular section 38 and thick cylindrical portion 35 are ground or dressed to the same diameter as the outer diameter of the tube 23b. The inner periphery of ring 32 is bored out to the inner diameter of the tube 23b. Thus, a ferrite containing weld material tube extension is formed on the end of the tube 23b composed of triangular portion 38 and trapezoidal portion 39, as shown in Fig. 13.

This tube end "buttered" with ferrite containing material is then inserted and expanded in hole 24 of a tube sheet 1 and welded therein at 40 as shown in Fig. 14, in the manner previously described in connection with Figs. 6 and 10. Thus, a sound weld 40 is provided between two sections of ferrite containing weld material which are respectively welded to low carbon austenitic stainless steel tube material and low carbon austenitic stainless steel tube sheet material.

It is preferable that the chemical analysis of the weld rod used for deposit of the ferrite containing weld material be as near the same as that of the base or parent metal or parts to be welded as possible, with the exception that the weld rod should preferably contain approximately 8% ferrite as deposited.

In each of the three modifications of the present invention, the final weld, between either low carbon austenitic stainless steel and ferrite containing weld material, or between two portions of ferrite containing weld material, is formed by fusing the metals together by Heliarc welding without depositing any additional weld material in the final weld. However, ferrite containing weld metal may be added during Heliarc welding if desired.

In any event, the problem of dilution of the weld by the base metal, that is, the stainless steel, is eliminated, since in no instance is the weld formed directly between two portions formed of low carbon austenitic stainless steel. Rather, the joint is always formed between ferrite containing weld material portions, or between a portion of ferrite containing weld material and a stainless steel portion, and the presence of ferrite containing material prevents undesirable dilution of the weld.

Also, in every instance the thicknesses of material joined by the final welding or fusing operation are substantially the same. In this manner, the danger of microfissuring in this final weld is eliminated.

Thus the invention provides a method for producing a sound weld between tubes and tube sheets, both formed from a material that is not readily weldable such as type 347 low carbon austenitic stainless steel; provides a method for welding tubes to tube sheets in which the variation in grain size between the two parts does not cause microfissuring in the finished weld; provides a method for welding tubes to tube sheets in which the sections to be welded are of minimum thickness; provides a method for welding tubes to tube sheets in which the sections to be welded are of substantially uniform and the same thickness; provides a method for welding tubes to tube sheets in which microfissuring is completely eliminated; provides a method for welding tubes to tube sheets which does not require prohibitive controls in manufacture; and provides a new welded joint construction for stainless steel having all of the indicated characteristics and advantages and avoiding the prior difficulties and defects.

It should be understood that the term "ferrite-containing alloy weld material" or "ferrite-containing weld material" as used in the specification and claims is intended to include ferrite-containing material whether actually weld deposited or whether machine from tubes and bars of the proper ferrite content and then joined by welding or otherwise to the respective parts.

In the foregoing description, certain terms have been used for brevity, clearness and understanding, but no unnecessary limitations are to be implied therefrom, because such words are used for descriptive purposes herein and are intended to be broadly construed.

Moreover, the embodiments of the improved method and construction illustrated and described herein are by way of example and the scope of the present invention is not limited to the exact details shown.

Having now described the invention, the construction, method and use of preferred embodiments thereof, and the advantageous new and useful results obtained thereby, the new and useful constructions and methods and

I claim:

1. A sound microfissure-free welded joint between a metal heat exchanger tube sheet and a metal tube extending through the tube sheet each formed of type 347 austenitic stainless steel having poor weldability subject to microfissuring on cooling from welding temperature, the joint including a tubular wall portion formed on the tube sheet and having a radial wall thickness, a tubular end portion on the tube telescoped in said tubular wall portion, said tube end portion having a radial wall thickness substantially equal to the radial wall thickness of the remainder of the tube, at least one of said tubular wall and end portions being composed throughout its radial wall thickness of about 8% ferrite-containing type 347 austenitic stainless steel weld material, a fused weld free of added weld material other than about 8% ferrite-containing type 347 austenitic stainless steel weld material joining the tubular wall portion and tubular end portion together, and the radial wall thickness of the tubular wall portion being at least substantially as great as the radial wall thickness of said tubular end portion at said fused weld.

2. A sound microfissure-free welded joint between a metal heat exchanger tube sheet and a metal tube extending through the tube sheet each formed of type 347 austenitic stainless steel having poor weldability subject to microfissuring on cooling from welding temperature, the joint including a tubular wall portion formed on the tube sheet and having a radial wall thickness, a tubular end portion on the tube telescoped in said tubular wall portion, said tube end portion having a radial wall thickness substantially equal to the radial wall thickness of the remainder of the tube, the tubular wall portion being composed throughout its radial wall thickness of about 8% ferrite-containing type 347 austenitic stainless steel weld material, a fused weld free of added weld material joining the tubular wall portion and tubular end portion together, and the radial wall thickness of the tubular wall portion being at least substantially as great as the radial wall thickness of said tubular end portion at said fused weld.

3. A sound microfissure-free welded joint between a metal heat exchanger tube sheet and a metal tube extending through the tube sheet each formed of type 347 austenitic stainless steel having poor weldability subject to microfissuring on cooling from welding temperature, the joint including a tube sheet portion having a tube receiving hole formed therethrough, a groove formed in one face of the tube sheet portion surrounding and spaced radially from one end of the hole forming a tubular wall portion at said one end of the hole having an axial length and a radial wall thickness, a tube extending through said hole and having a tubular end portion telescoped in said tubular wall portion, said tube end portion having a radial wall thickness substantially equal to the radial wall thickness of the remainder of the tube, the tubular wall portion including a zone composed throughout its radial wall thickness of about 8% ferrite-containing type 347 austenitic stainless steel material, the ferrite-containing material zone extending from said one tube sheet face for at least part of the axial length of said tubular wall portion and being welded to the tube sheet metal, a fused weld free of added weld material joining the tubular portions together, and the radial wall thickness of said tubular wall portion being at least substantially as great as the radial wall thickness of said tube end portion at said fused weld.

4. The method of forming a sound, microfissure-free welded joint between a metal heat exchanger tube sheet and a metal tube extending through the tube sheet each formed of type 347 austenitic stainless steel having poor weldability subject to microfissuring on cooling from welding temperature, which includes the steps of providing a type 347 austenitic stainless steel tube sheet, forming a tube hole through the tube sheet, forming a cylindrical wall portion in the tube sheet surrounding one end of said hole and having a radial wall thickness, providing a zone of said cylindrical wall portion extending from said one end of said hole and throughout said radial wall thickness with about 8% ferrite-containing type 347 austenitic stainless steel weld material, telescoping a type 347 austenitic stainless steel tube in said hole with one tube end portion fitting within said ferrite-containing cylindrical wall portion, forming the ferrite-containing zone with a radial wall thickness at least substantially as great as the radial wall thickness of the tube, and forming a fused weld free of added weld material other than about 8% ferrite-containing type 347 austenitic stainless steel weld material between said tube end and said ferrite-containing cylindrical wall portion of the tube sheet.

5. The method of forming a sound, microfissure-free welded joint between a metal heat exchanger tube sheet and a metal tube extending through the tube sheet each formed of type 347 austenitic stainless steel having poor weldability subject to microfissuring on cooling from welding temperature, which includes the steps of providing a type 347 austenitic stainless steel tube sheet, forming a tube hole through the tube sheet, forming a groove in one face of the tube sheet surrounding and spaced radially from one end of the hole thereby forming a tubular wall portion at said one end of the hole having an axial length and a radial wall thickness, providing a zone of said cylindrical wall portion extending from said one end of said hole and throughout said radial wall thickness with about 8% ferrite-containing type 347 austenitic stainless steel weld material, telescoping a type 347 austenitic stainless steel tube in said hole with one tube end portion fitting within said ferrite-containing cylindrical wall portion, forming the ferrite-containing zone with a radial wall thickness at least substantially as great as the radial wall thickness of the tube, and forming a fused weld free of added weld material between said tube one end and said ferrite-containing cylindrical wall portion of the tube sheet.

6. The method of forming a sound, microfissure-free welded joint between a metal heat exchanger tube sheet and a metal tube extending through the tube sheet each formed of type 347 austenitic stainless steel having poor weldability subject to microfissuring on cooling from welding temperature, which includes the steps of providing a type 347 austenitic stainless steel tube sheet, forming a shallow recess in one side of the tube sheet having bottom and peripheral surfaces with a corner therebetween, weld-depositing an annular ring of about 8% ferrite-containing type 347 austenitic stainless steel metal on the tube sheet metal around and inside the corner and the adjacent bottom and peripheral surfaces of the recess, drilling a tube hole through the weld-deposited metal ring and tube sheet metal extending to the other side of the tube sheet, forming a groove in a portion of the weld-deposited metal surrounding and spaced radially from said one side end of the hole thereby forming a tubular wall portion at said one side end of the hole composed of said weld-deposited metal in a zone extending from said one side end of the hole and throughout the radial wall thickness of said tubular wall portion, telescoping a type 347 austenitic stainless steel tube in said hole with one tube end portion fitting within said weld-deposited metal tubular wall portion, forming said groove spaced radially from said one side end of the hole a distance equal to at least the radial wall thickness of said tube thereby forming said weld-deposited metal tubular wall portion with a radial wall thickness at least substantially as great as the tube radial wall thickness, and forming a fused weld free of added weld material between said tube one end and said weld-deposited metal tubular wall portion.

7. The method of forming a microfissure-free welded joint between a type 347 austenitic stainless steel tube sheet and a type 347 austenitic stainless steel heat exchanger tube, which includes the steps of providing a type 347 austenitic stainless steel tube sheet, depositing about 8% ferrite-containing type 347 austenitic stainless steel weld metal in a zone at one surface of the tube sheet surrounding an opening formed in the tube sheet for a radial thickness at least as great as the radial wall thickness of a tube to be joined to the tube sheet, telescoping an end of a type 347 austenitic stainless steel tube in said opening with the end portion of the tube surrounded by said ferrite-containing deposited weld metal, and fusion welding the deposited ferrite-containing metal to the tube free of added weld metal to form a welded joint between said deposited metal and the tube.

References Cited in the file of this patent

UNITED STATES PATENTS

| | | |
|---|---|---|
| 1,648,307 | Hawley | Nov. 8, 1927 |
| 1,959,791 | Kautz | May 22, 1934 |
| 2,047,633 | Jacobus | July 14, 1936 |
| 2,122,994 | Southgate | July 5, 1938 |
| 2,166,890 | Desmond | July 18, 1939 |
| 2,183,043 | Kerr | Dec. 12, 1939 |
| 2,200,229 | Strauss | May 7, 1940 |
| 2,209,975 | Jacobus | Aug. 6, 1940 |
| 2,228,087 | Rose | Jan. 7, 1941 |
| 2,240,672 | Sherer | May 6, 1941 |
| 2,368,391 | Young | Jan. 30, 1945 |
| 2,659,966 | Turnbull | Nov. 24, 1953 |
| 2,709,295 | Chyle | May 31, 1955 |
| 2,759,249 | Eberle | Aug. 21, 1956 |
| 2,785,459 | Carpenter | Mar. 19, 1957 |
| 2,787,699 | Jessen | Apr. 2, 1957 |

OTHER REFERENCES

Welding Handbook, third edition, pages 651–654. Published by American Welding Society, New York, New York.